United States Patent
Kaneyoshi et al.

(10) Patent No.: US 9,611,425 B2
(45) Date of Patent: Apr. 4, 2017

(54) METHOD FOR TREATING MN-ACTIVATED COMPLEX FLUORIDE PHOSPHOR

(71) Applicant: Shin-Etsu Chemical Co., Ltd., Tokyo (JP)

(72) Inventors: Masami Kaneyoshi, Echizen (JP); Kazuhiro Wataya, Echizen (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 0 days.

(21) Appl. No.: 14/920,615

(22) Filed: Oct. 22, 2015

(65) Prior Publication Data
US 2016/0122633 A1 May 5, 2016

(30) Foreign Application Priority Data
Oct. 30, 2014 (JP) .................. 2014-220987

(51) Int. Cl.
C09K 11/61 (2006.01)

(52) U.S. Cl.
CPC .......... *C09K 11/617* (2013.01); *C09K 11/616* (2013.01)

(58) Field of Classification Search
CPC ... C09K 11/616; C09K 11/617; C09K 11/675; C09K 11/628; C09K 11/645; C09K 11/665; C09K 11/0838; C09K 11/02; C09K 11/664; C09K 2211/181; C09K 2211/188; H01L 33/502; H01L 33/504; H01L 33/507; H01L 33/52; Y02B 20/181
USPC ....... 252/301.4 F, 301.4 H, 301.4 R, 301.6 F
See application file for complete search history.

(56) References Cited

U.S. PATENT DOCUMENTS

| | | | |
|---|---|---|---|
| 3,576,756 A | 4/1971 | Russo | |
| 2012/0256125 A1 | 10/2012 | Kaneyoshi et al. | |
| 2013/0271960 A1 | 10/2013 | Hong et al. | |
| 2014/0264418 A1* | 9/2014 | Murphy | ............... H01L 33/52 257/98 |
| 2014/0268655 A1* | 9/2014 | Murphy | ............... C09K 11/616 362/97.1 |

FOREIGN PATENT DOCUMENTS

| | | |
|---|---|---|
| EP | 2 774 966 A1 | 9/2014 |
| JP | 2009-528429 A | 8/2009 |
| JP | 4582259 B2 | 11/2010 |

(Continued)

OTHER PUBLICATIONS

Exended (Supplementary) Search Report dated Mar. 21, 2016, issued in counterpart European Application 15191504.8 (6 pages).

*Primary Examiner* — Matthew E Hoban
*Assistant Examiner* — Lynne Edmondson
(74) *Attorney, Agent, or Firm* — Westerman, Hattori, Daniels & Adrian, LLP

(57) ABSTRACT

A method for treating a Mn-activated complex fluoride phosphor is provided wherein a preliminarily-prepared red phosphor of a Mn-activated complex fluoride represented by the following formula (1):

$$A_2MF_6:Mn \qquad (1)$$

wherein M represents at least one tetravalent element selected from Si, Ti, Zr, Hf, Ge and Sn, A represents at least one alkali metal selected from Li, Na, K, Rb and Cs provided that at least Na and/or K is contained, is heated in a substantially oxygen atom-free gas but containing a fluorine atom at a temperature of at least 50° C.

4 Claims, 5 Drawing Sheets

(56) References Cited

FOREIGN PATENT DOCUMENTS

| | | |
|---|---|---|
| JP | 2012-224536 A | 11/2012 |
| JP | 2014-141684 A | 8/2014 |
| WO | 2007/100824 A3 | 9/2007 |

\* cited by examiner

FIG.2

METHOD FOR TREATING MN-ACTIVATED COMPLEX FLUORIDE PHOSPHOR

CROSS-REFERENCE TO RELATED APPLICATION

This non-provisional application claims priority under 35 U.S.C. §119(a) on Patent Application No. 2014-220987 filed in Japan on Oct. 30, 2014, the entire contents of which are hereby incorporated by reference.

TECHNICAL FIELD

The present invention relates to a method for treating a Mn-activated complex fluoride red phosphor (complex fluoride phosphor) which is useful as a red phosphor for blue light emitting diode (LED) and is represented by the formula of $A_2MF_6$:Mn wherein M is at least one tetravalent element selected from Si, Ti, Zr, Hf, Ge and Sn, and A is at least one alkali metal selected from Li, Na, K, Rb and Cs and contains at least Na and/or K.

BACKGROUND ART

For the purpose of improving color rendering properties of a white LED or improving color reproducibility in the case where a white LED is used as back light of liquid crystal displays, there is needed a phosphor that is excited with light corresponding to near-ultraviolet to blue LEDs to emit red light, for which studies are now being in progress. In JP-T 2009-528429 corresponding to WO 2007/100824 (Patent Document 1), a complex fluoride phosphor, in which Mn is added to a complex fluoride represented by the formula of $A_2MF_6$ wherein A represents Na, K, Rb or the like and M represents Si, Ge, Ti or the like, is stated as useful.

In recent years, on the other hand, there is a technical demand for increasing a light flux per unit white LED, for which an attempt has been made to increase an amount of current flowing in the LED chip. In this attempt, a phosphor is continuously exposed to intense excitation light (such as of blue color) with the possibility that the temperature rises. As a consequence, it has been found that the light emission of the phosphor lowers during a long period of time, and there occurs a phenomenon of changing the color of a white LED or reducing the light flux.

Aside from the above Patent Document 1, in related art according to the present invention is indicated in U.S. Pat. No. 3,576,756 (Patent Document 2), JP 4582259 corresponding to US 2013/271960 (A1) (Patent Document 3), JP-A 2012-224536 corresponding to US 2012/256125 (A1) (Patent Document 4), and JP-A 2014-141684 corresponding to EP 2774966 (A1) (Patent Document 5).

DISCLOSURE OF THE INVENTION

The present invention has been made under such circumstances as stated above and an object of the present invention is to provide a method for treating a Mn-activated complex fluoride phosphor which is effective for unlikelihood of a complex fluoride phosphor used for white LEDs to be degraded when applied with great electric current for lighting.

The inventors have made intensive studies so as to achieve the above object and, as a result, found that when a red phosphor, which is a preliminarily-prepared Mn-activated complex fluoride, is heated in a gas that contains a fluorine atom and is substantially free of an oxygen atom, the degradation of the phosphor can be suppressed. The conditions therefore have been investigated thereby accomplishing the present invention.

More particularly, the present invention contemplates to provide a method for treating a Mn-activated complex fluoride phosphor as set forth below.

Accordingly, in one aspect, the present invention provides a method for treating a Mn-activated complex fluoride phosphor, including heating a preliminarily-prepared red phosphor of a Mn-activated complex fluoride represented by the following formula (1):

$$A_2MF_6\text{:Mn} \quad (1)$$

wherein M represents at least one tetravalent element selected from Si, Ti, Zr, Hf, Ge and Sn, A represents at least one alkali metal selected from Li, Na, K, Rb and Cs provided that at least Na and/or K is contained, in a substantially oxygen atom-free gas containing a fluorine atom at a temperature of at least 50° C.

In the method for treating the Mn-activated complex fluoride phosphor, a thermal treatment is preferably carried out in an atmosphere of a gas containing at least one of $F_2$, HF (anhydrous), $CF_4$, $SF_6$, $BF_3$, $NF_3$ and $SiF_4$ or a mixed gas thereof with $N_2$ or Ar.

In the method for treating the Mn-activated complex fluoride phosphor, the temperature for heating the phosphor is preferably up to 600° C.

Advantageous Effects of the Invention

According to the present invention, there can be obtained the Mn-activated complex fluoride phosphor which is unlikely to be degraded when used for white LEDs and turned on under great electric current over a long time and which is eventually unlikely to lower the emission intensity (light flux) of LED and also to change the emission color.

BRIEF DESCRIPTION OF THE DRAWINGS

FIGS. 1A and 1B are each a schematic view showing an example of a treating apparatus for carrying out the present invention wherein FIG. 1A is a schematic longitudinal sectional view and FIG. 1B is a schematic cross sectional view;

FIGS. 3A and 3B are each a schematic view showing an LED used for a lighting test in the examples of the present invention wherein FIG. 3A is a schematic plan view and FIG. 3B is a schematic sectional view.

DESCRIPTION OF THE PREFERRED EMBODIMENTS

The embodiments of a treating method of a complex fluoride phosphor according to the present invention are now described.

The method of the present invention for treating a phosphor includes heating a red phosphor of a Mn-activated complex fluoride represented by the following formula (1):

$$A_2MF_6\text{:Mn} \quad (1)$$

wherein M represents at least one tetravalent element selected from Si, Ti, Zr, Hf, Ge and Sn, A represents at least one alkali metal selected from Li, Na, K, Rb and Cs provided that at least Na and/or K is contained, in a substantially oxygen atom-free gas containing a fluorine atom at a temperature of at least 50° C.

The complex fluoride phosphor to be treated in the present invention may be ones that are prepared by known methods. An instance therefor is particularly described in Reference Examples hereinafter but is not construed as limited thereto. Although the particle size of the phosphor is not substantially critical, the center particle size (D50) determined by a laser diffraction method is generally at 1 µm to 100 µm, preferably at 3 µm to 60 µm.

For the treatment of the present invention, a container and a heating device are used. A material to be treated is charged in the container and a gas used for the treatment is introduced in and discharged from the container. Because a treating gas described hereinafter is very corrosive, a nickel-containing metal or alloy that is resistant to the gas is preferred as a material for the container. Where the treating temperature is up to 200° C., there may be used fluorine resins such as polytetrafluoroethylene (PTFE), perfluoroalkoxy (PFA) and the like, or ordinary metals covered with the fluorine resins. Among nickel-containing metals or alloys, preferred ones include pure nickel not containing other elements, monel, Hastelloy and the like. If the treating temperature is up to 200° C., stainless steels (SUSs) may be used.

The gas forming an atmosphere during treatment in the present invention should contain a fluorine atom and be substantially free of an oxygen atom. The ratio of gases of dioxygen ($O_2$) or/and an oxygen-containing compound is up to 0.5% by volume, preferably up to 0.1% by volume and more preferably up to 0.02% by volume. If dioxygen and an oxygen atom-containing molecule are contained beyond the limit, the purpose of the treatment may not be achieved and, in the worst case, the emission characteristics (initial) of the phosphor may lower.

For a gas containing a fluorine atom in the atmosphere in which the thermal treatment is carried out, there can be used pure gases or mixtures of compounds such as $F_2$, HF (anhydrous), $CF_4$, $SF_6$, $BF_3$, $NF_3$, $SiF_4$ and the like. Besides, mixed gases of the above fluorine-containing compounds and $N_2$ or Ar may also be used. In this case, the ratio of a fluorine compound in the total gas is at least 1% by volume, preferably at least 5% by volume and more preferably at least 10% by volume.

It will be noted that if the fluorine-containing gas consists of $CF_4$, $SF_6$, $SiF_4$ or $NF_3$ and $N_2$ or Ar, a quartz glass container may also be used aside from the above material containers.

For the method of contacting a fluorine-containing gas with a phosphor to be treated, there can be used any of methods including a method wherein using a treating container having an inlet and an outlet for gas, stationary gas flow from the inlet toward the outlet is established, followed by thermal treatment, a method wherein a treating container is once purged to vacuum, into which a treating gas is subsequently charged to an atmospheric pressure, followed by opening an outlet and heating under continuing flow of a gas, and a method wherein a treating gas is introduced after vacuum purge, followed by hermetic sealing and heating. Although the pressure of a treating gas during the treatment may be constrained depending on the type of container material, it is preferably up to 0.3 MPa even under heating while taking the danger of a fluorine compound used in the present invention into account. The pressure is more preferably up 0.2 MPa, much more preferably up to 0.15 MPa.

The method of heating the phosphor to be treated may include any optional methods, provided that a heating apparatus is not corroded by means of a treating gas, including a method wherein a heater is provided outside a treating container so as to heat the treating container from an outer wall thereof, a method wherein a treating container places itself in high temperature atmosphere such as automatic oven, and a method wherein if the container is formed of a transparent material such as a fluorine resin, quartz glass or the like, a material to be treated is heated with an infrared lamp, and the like.

The temperature for heating a phosphor in a fluorine-containing gas should be at least 50° C. If less than 50° C., intended effects cannot be obtained. The temperature is more preferably at least 70° C., much more preferably at least 100° C. This heating temperature is preferably up to 600° C. If the temperature exceeds 600° C., there is some concern that decomposition of the phosphor may occur. The temperature is more preferably up to 550° C., much more preferably up to 500° C. It will be noted that the treating time is generally at one hour to 24 hours, preferably at two hours to 16 hours.

EXAMPLES

Examples and Comparative Examples are shown to more particularly illustrate the present invention, which are not construed as limited thereto.

Reference 1

Preparation of $K_2MnF_6$

In accordance with the method described in New Experimental Chemical Course 8 "Syntheses of Inorganic Compounds III," published by Maruzen Co., Ltd., edited by The Chemical Society of Japan and issued 1977, p. 1,166, the preparation was made in the following way.

A partition (separating membrane) of a fluorine resin ion exchange membrane was provided at the center of a polyvinyl chloride resin reaction vessel, and an anode and a cathode, each made of a platinum plate, were set in the respective two chambers sandwiching the ion exchange membrane therebetween. A hydrofluoric acid aqueous solution dissolving manganese (II) fluoride therein was placed at the anode side of the reaction vessel and a hydrofluoric acid aqueous solution was placed at the cathode side. Both electrodes were connected and electrolysis was carried under conditions of a voltage of 3 V and a current of 0.75 A. After completion of the electrolysis, a solution obtained by saturating potassium fluoride in a hydrofluoric acid aqueous solution was added in excess to the reaction solution at the anode side. The resulting yellow solid product was separated by filtration and collected to obtain $K_2MnF_6$.

Reference 2

Preparation of a Complex Fluoride Red Phosphor Provided for Treatment

234 $cm^3$ of a 40 wt % of a fluorosilicic ($H_2SiF_6$) aqueous solution (made by Morita Chemical Industries Co., Ltd.) was mixed with 2,660 $cm^3$ of 50 wt % hydrofluoric acid (HF) (SA-X, made by Stella Chemifa Co., Ltd.). 13.32 g of $K_2MnF_6$ powder preliminarily-prepared by the method of Reference 1 was added to and dissolved in the mixture under agitation (first solution).

Separately, 210.5 g of potassium bifluoride (acidic potassium fluoride, $KHF_2$, made by Stella Chemifa Co., Ltd.) was mixed with and dissolved in 680 $cm^3$ of a 50 wt % hydrofluoric acid aqueous solution and 1,270 $cm^3$ of pure water (second solution).

While agitating the first solution at room temperature (16° C.) by use of an agitation blade and a motor, the second solution (15° C.) was added thereto portion by portion in one minute and 30 seconds. The temperature of the resulting solution reached 26° C. thereby forming a light orange precipitate ($K_2SiF_6$:Mn). Further, agitation was continued for 10 minutes, followed by separating the precipitate by filtration with Buchner funnel and removing the solution to an extent as small as possible. Moreover, the precipitate was rinsed with acetone, followed by removal of the liquid and vacuum drying to obtain 183.0 g of a powder product of $K_2SiF_6$:Mn.

The size distribution of the thus obtained powder product was measured by means of a gas flow dispersion-type laser diffraction size distribution measuring apparatus (HELOS & RODOS, made by Sympatec Inc.). As a result, it was found that those particles having a particle size of up to 8.8 μm were at 10% of the total volume (D10=8.8 μm), particles having a size of up to 19.4 μm were at 50% of the total volume (D50=19.4 μm), and particles having a size of up to 29.6 μm were at 90% of the total volume (D90=29.6 μm).

It is to be noted that this phosphor was used as a starting material of the following examples, and also for comparative examples in a lighting test appearing hereinafter.

Example 1

Figure 1A:
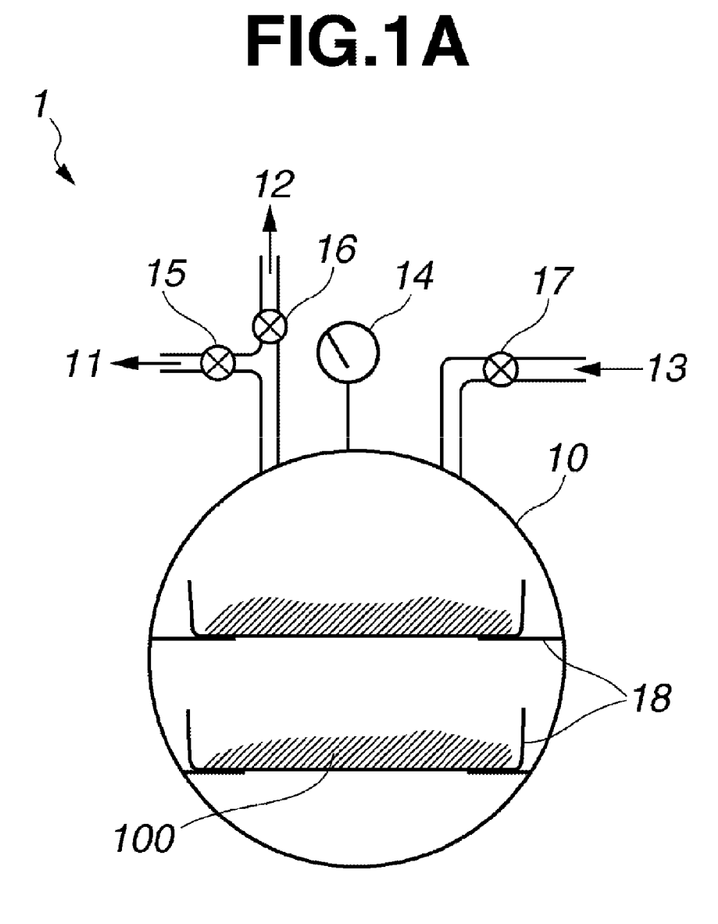
Figure 1B:
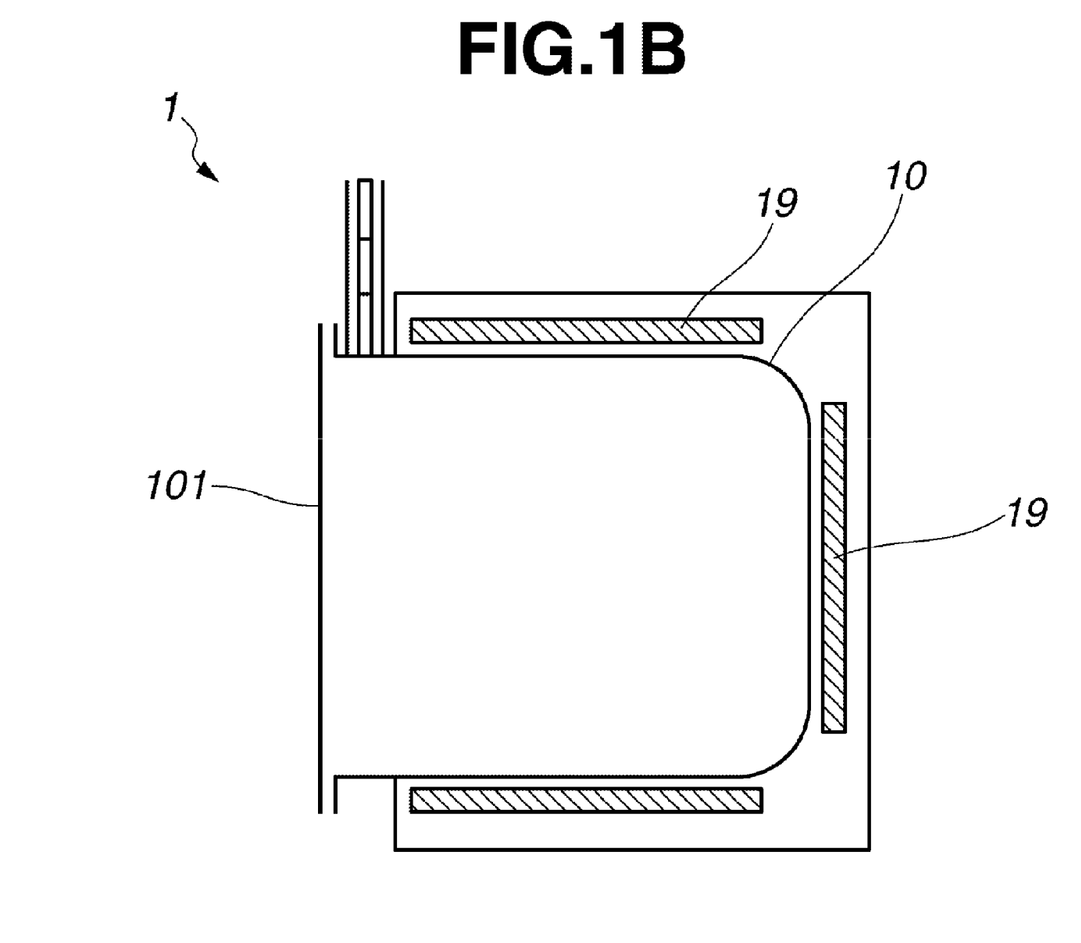

As one example of a treating apparatus used in the present invention, an apparatus 1 shown in FIGS. 1A and 1B was used. In FIGS. 1A and 1B, indicated as 10 is a treating container made of Monel, as 11 is an exhaust port to a vacuum pump, as 12 is an exhaust port to a bent, as 13 is a gas introduction port, as 14 is a pressure gauge, as 15, 16, and 17 are valves, as 18 is a sample plate made of nickel, as 19 is a heater, as 100 is a phosphor to be treated, and as 101 is a door through which a sample is taken in or out and which is capable of sealing the apparatus when closed.

Using the apparatus shown in FIGS. 1A and 1B, the phosphor 100 prepared in Reference 2 was spread thoroughly on two sample plates 18, each in an amount of 20 g and thus in a total amount of 40 g, followed by setting in the treating container 10. The sample thickness was found to be at about 2 mm. The door 101 was closed, followed by confirming that the respective valves were closed. The valve 15 was opened and the vacuum pump was driven to evacuate the treating container from the exhaust port 11. After the valve 15 was closed and the valve 17 was subsequently opened, fluorine ($F_2$) was introduced from an introduction port 13, connected to a fluorine gas source, to a level of 0.04 MPa while observing the pressure gauge 14. Next, the valve 17 was closed and the heater 19 was put on to heat the inside of the treating container up to 400° C. While keeping the temperature at 400° C., the container was allowed to stand over six hours. Thereafter, the heater was put off, followed by cooling down to 180° C. A nitrogen source was connected to the introduction port 13, followed by opening the valves 16 and 17 and commencing to pass nitrogen into the container in an amount of about 0.5 liters/minute. After one hour, it was confirmed that the temperature was down to up to 50° C., the introduction of nitrogen was stopped and the door was opened to collect a treated matter.

Example 2

Figure 2:
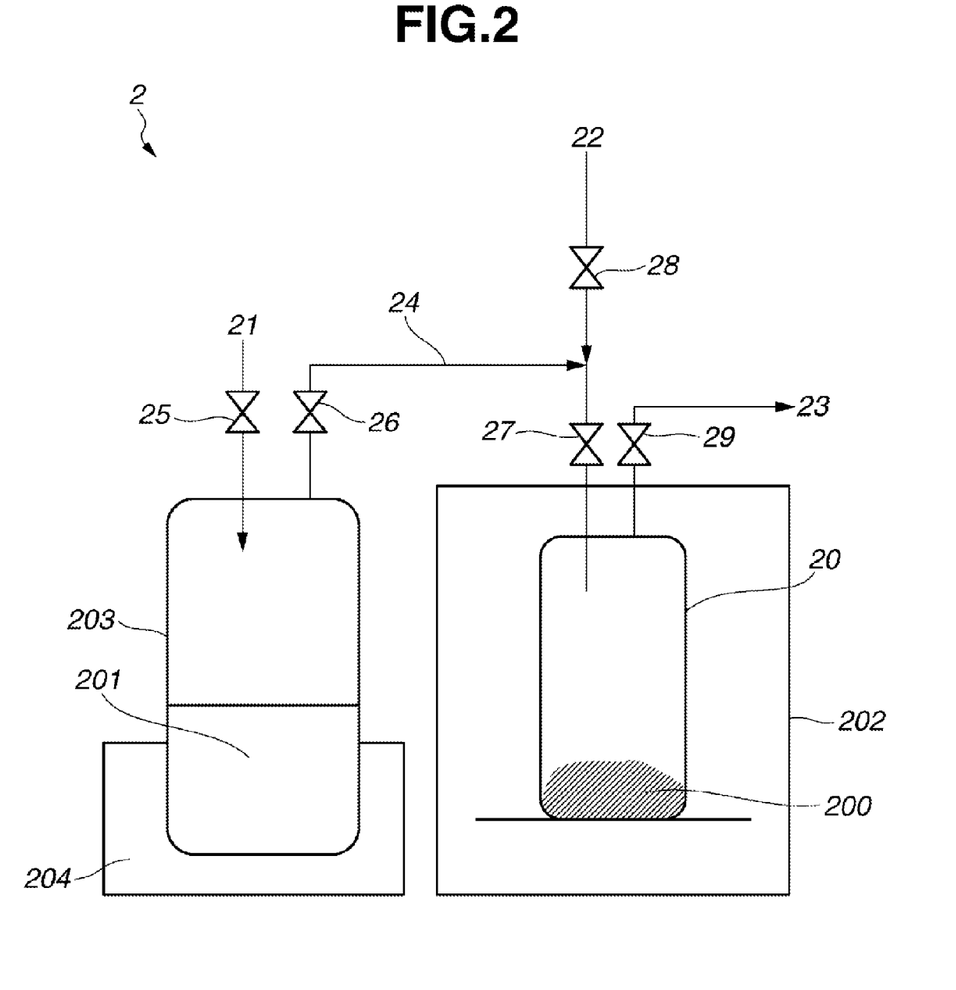
FIG. 2 is a schematic view showing another example of a treating apparatus for carrying out the present invention.

As another instance of a treating apparatus used in the present invention, an apparatus 2 shown in FIG. 2 was used. In FIG. 2, indicated as 20 is a treating container made of PFA, as 21 is a carrier gas introduction port, as 22 is a purge gas introduction port, as 23 is an exhaust port, as 24 is a treating gas introduction pipe made of PFA, as 25, 26, 27, 28, and 29 are valves, as 200 is a phosphor to be treated, as 201 is anhydrous hydrofluoric acid (HF), as 202 is a thermostatic drying oven, as 203 is a HF container made of PFA, and as 204 is a water bath.

Using the apparatus shown in FIG. 2, 25 g of the phosphor 200 prepared in Reference 2 was placed on the bottom of the treating container 20 whose valves 27 and 29 had been closed. 2.5 liters of anhydrous hydrofluoric acid 201 was placed in another PFA container 203 whose valves 25 and 26 had been closed. The valve 28 had also been closed. The treating container 20 was placed in the thermostatic drying oven 202, and the gas introduction pipe 24 was connected, followed by placing the container 203 for HF was placed in the water bath 204 set at 20° C. The valves 25, 26, 27, and 29 were opened, followed by flowing nitrogen from the carrier gas introduction port 21 at a rate of 3 liters/minute. The anhydrous hydrofluoric acid 201 in the HF container 203 was introduced into the treating container 20 with nitrogen gas. After 30 minutes, a heater of the thermostatic drying oven 202 was put on so as to raise the temperature up to 160° C. The heating was continued over 10 hours while flowing nitrogen and keeping the temperature at 160° C. After 10 hours, the heating was stopped and the valves 25 and 26 were closed, and instead, the valve 28 was opened so that nitrogen was flown from the purge gas introduction port 22 at a rate of 10 liters/minute. After 30 minutes, it was confirmed that the inside of the thermostatic drying oven was down to up to 50° C., after which the treating container was taken out to collect a treated matter.

Example 3

10 g of the phosphor prepared in Reference 2 was set in a treating furnace VHC-P610CP (ULVAC-RIKO, Inc.) which was designed to hold a sample in a quartz sample tube and also to heat the sample with a lamp from outside the quartz tube. The tube was vacuumed, after which $CF_4$ was introduced from an introduction port connected to a $CF_4$ tank (a 99.9% product of Kanto Denka Kogyo Co., Ltd.). At the time when the pressure in the tube reached atmospheric pressure, a check valve at the outlet side worked thereby causing $CF_4$ to be passed. At this stage, a flowmeter was so checked that the flow rate was controlled at 0.3 liters/minute. The lamp was turned on to heat the sample to 350° C. The heating was continued over four hours while flowing gas and keeping the temperature at 350° C. Subsequently, the lamp was turned off for cooling. When the temperature was lowered to 150° C. or below, a gas being flown was changed to nitrogen, followed by further cooling down to up to 50° C. and taking out a treated matter.

Example 4

A treated matter was obtained in the same manner as in Example 3 except that $SiF_4$ was flown instead of $CF_4$ after connection to an $SiF_4$ tank (a 99.9% product of Kanto Denka Kogyo Co., Ltd.) and that the holding temperature was set at 450° C.

[Lighting Test]

Figure 3A:
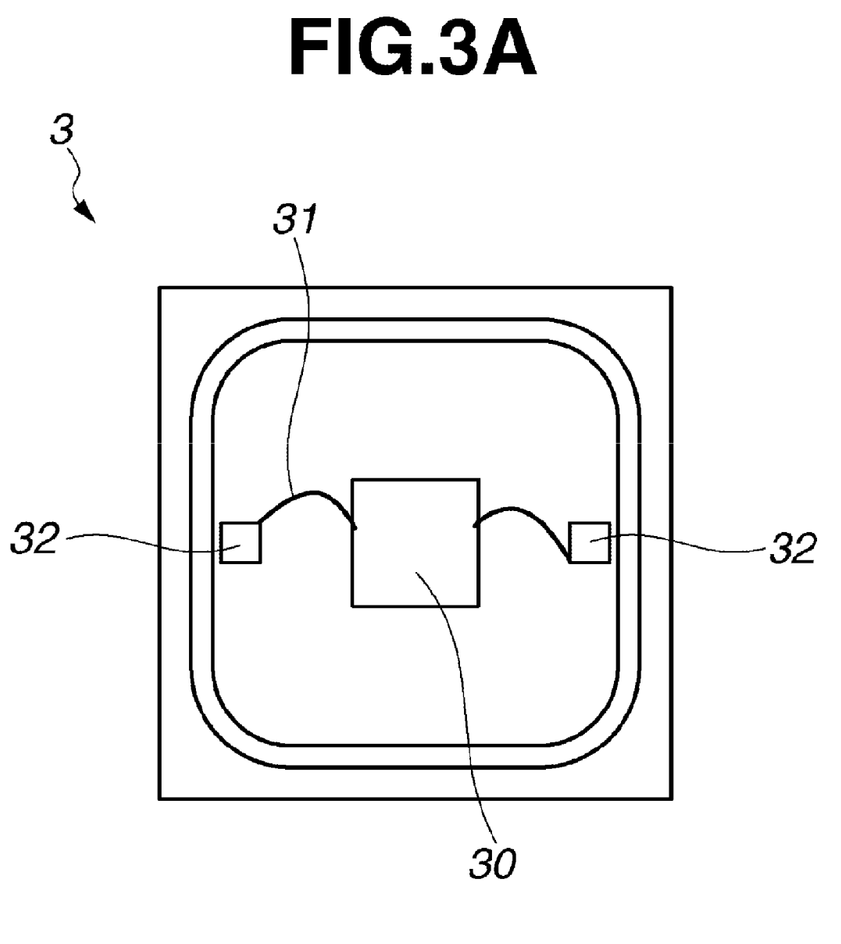
Figure 3B:
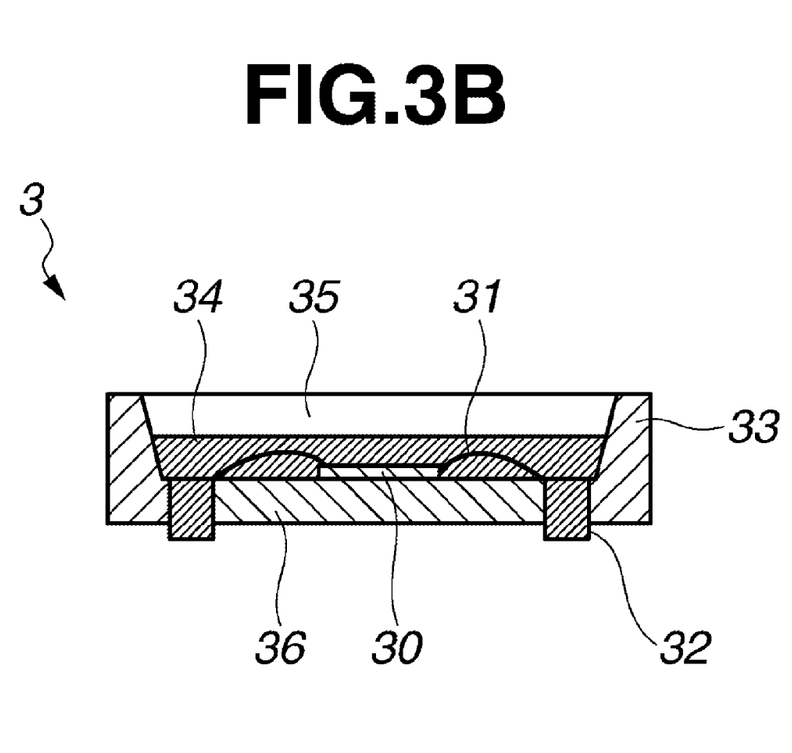

A blue LED (SMB-FLAT-1723, made by Epitex Inc.) shown in FIGS. 3A and 3B was used. The emission peak wavelength was at 460 nm and a peak half width was at 20 nm. In the figures, indicated as 3 is an LED whole body for the lighting test, as 30 is a blue LED chip, as 31 is a wiring, as 32 is an electrode for electric supply to the LED, and as 33 is a reflective material-attached outer frame. A sealer-filled portion 34 was formed by depositing a silicone resin (KER-6020A/B, made by Shin-Etsu Chemical Co., Ltd.) on the blue LED chip 32 in a thickness of 0.4 mm. Reference numeral 35 is a recess with a depth of 0.4 mm. 4 mg of each of the phosphors of Examples 1 to 4 and Comparative Example was applied on to the sealer-filled portion 34 in the recess 35 so as to allow it to cover the sealer-filled portion 34 as uniformly as possible, followed by continuous lighting of the blue LED chip under conditions of a voltage of 3.5 V and an electric current of 350 mA. It is to be noted that reference numeral 36 is a support base.

For the measurement of emission intensity and spectra (emission color), the LED for the lighting test was placed at a central portion of a total light flux measuring system (HH41-0464-1, made by Otsuka Electronics Co., Ltd.) provided with an integrating sphere having a diameter of 500 mm and turned on thereby measuring a total light flux and spectra. The results are shown in Table 1. The chromaticity x in the table means an x value in the CIE chromaticity coordinate and is regarded as indicating a degree of redness.

TABLE 1

|  | Initial light flux | Initial chromaticity x | Light flux after 200 hours | Chromaticity x after 200 hours | Difference x between chromaticity after 200 hours and initial chromaticity |
|---|---|---|---|---|---|
| Example 1 | 20.2 | 0.462 | 19.6 | 0.458 | 0.004 |
| Example 2 | 21.0 | 0.466 | 20.0 | 0.463 | 0.003 |
| Example 3 | 20.3 | 0.463 | 19.0 | 0.458 | 0.005 |
| Example 4 | 20.4 | 0.463 | 18.7 | 0.457 | 0.006 |
| Comparative Example | 20.9 | 0.468 | 18.0 | 0.457 | 0.011 |

Japanese Patent Application No. 2014-220987 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for treating a Mn-activated complex fluoride phosphor comprising:
heating a preliminarily-prepared red phosphor of a Mn-activated complex fluoride represented by the following formula (1):

$$A_2MF_6:Mn \tag{1}$$

wherein M represents at least one tetravalent element selected from the group consisting of Si, Ti, Zr, Hf, Ge and Sn, A represents at least one alkali metal selected from the group consisting of Li, Na, K, Rb and Cs provided that at least Na and/or K is contained, in a substantially oxygen atom-free gas containing a fluorine atom at a temperature in a range of 50° C. to 600° C., and wherein the substantially oxygen atom-free gas containing a fluorine atom is a gas containing at least one of $CF_4$ and $BF_3$ or a mixed gas thereof with $N_2$ or Ar.

2. The method for treating a Mn-activated complex fluoride phosphor according to claim 1, wherein the temperature is in a range of 50° C. to 200° C.

3. The method for treating a Mn-activated complex fluoride phosphor according to claim 1, wherein the substantially oxygen atom-free gas containing a fluorine atom contains at least 5% by volume of fluorine compound.

4. The method for treating a Mn-activated complex fluoride phosphor according to claim 1, wherein the substantially oxygen atom-free gas containing a fluorine atom contains at least 10% by volume of fluorine compound.

* * * * *